Patented Oct. 21, 1930

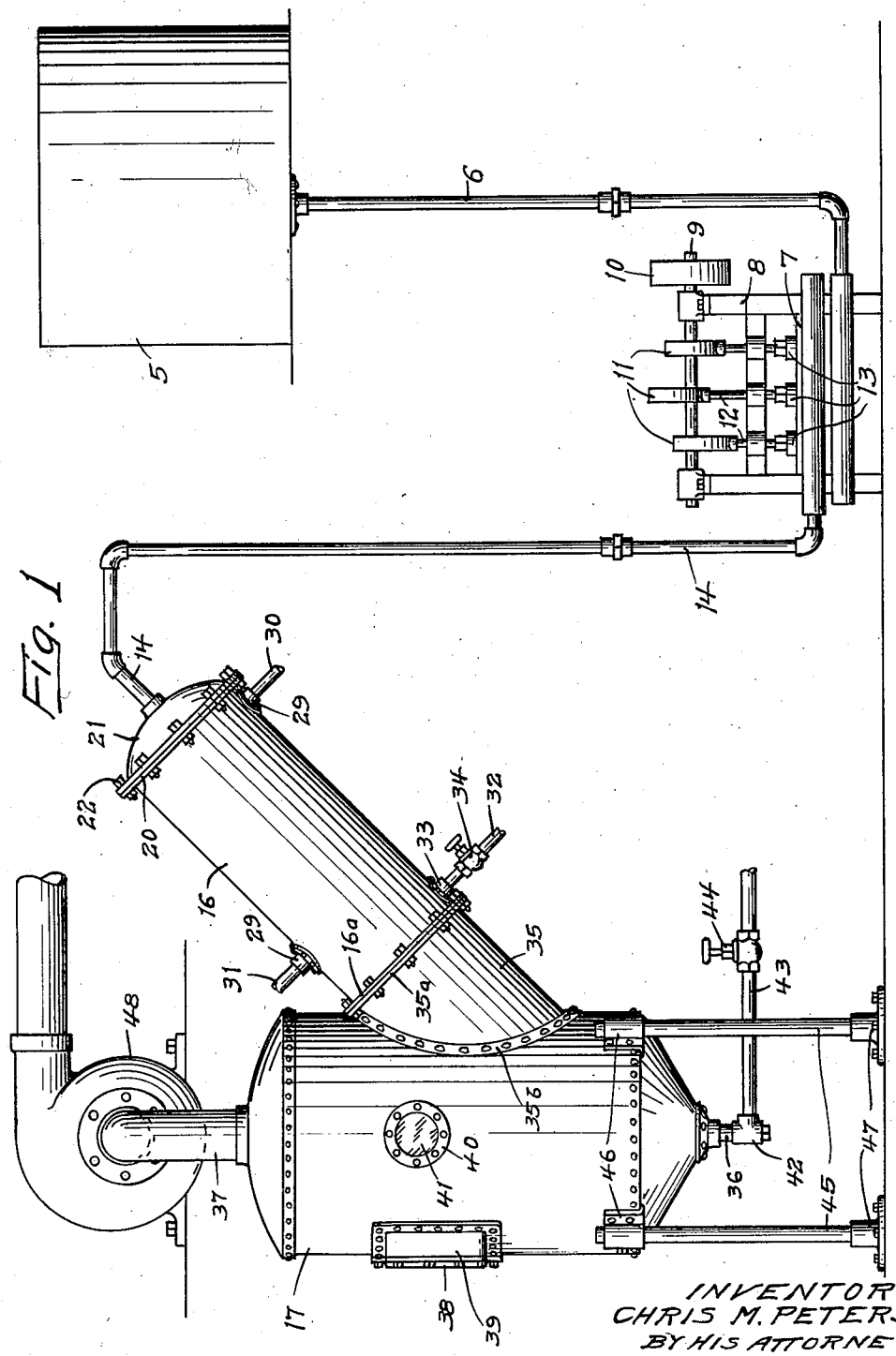

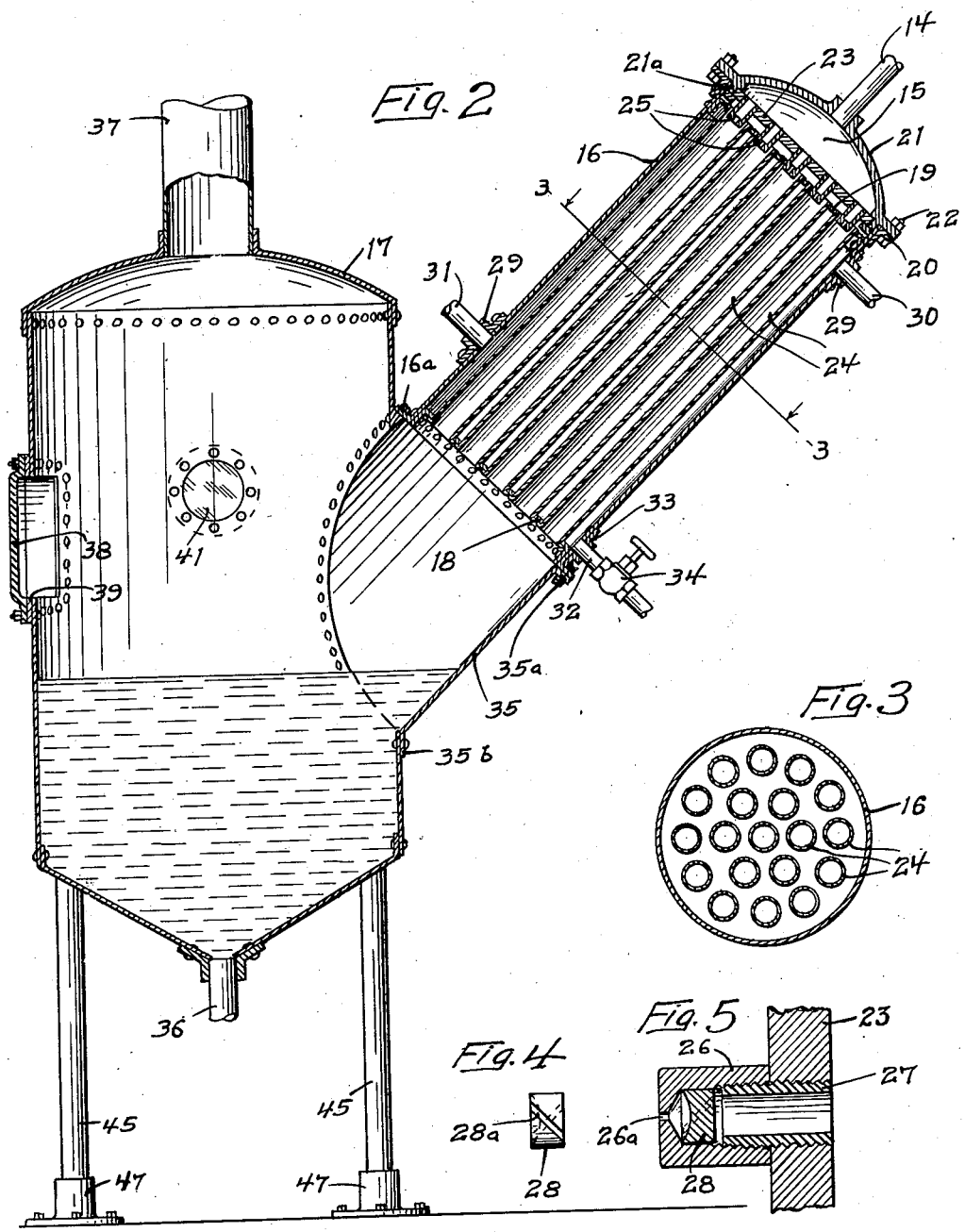

1,778,959

UNITED STATES PATENT OFFICE

CHRIS M. PETERSON, OF MINNEAPOLIS, MINNESOTA, ASSIGNOR TO WARD DRY MILK COMPANY, OF ST. PAUL, MINNESOTA, A CORPORATION OF MINNESOTA

MILK EVAPORATOR AND DEODORIZER

Application filed May 28, 1926. Serial No. 112,351.

This invention relates to an apparatus for evaporating or condensing and deodorizing liquids such as milk, cream, buttermilk and the like. As is well known to those skilled in the art, there is at present quite a large amount of milk which is dried. There is also now a large amount of sweet buttermilk resulting from the manufacture of butter in the numerous creameries in the country, which is also dried. While the present apparatus is applicable in use to any kind of milk or liquid to be partially evaporated, it particularly has been designed and used for preliminary evaporating the buttermilk produced in creameries.

It is an object of this invention to provide apparatus for evaporating and deodorizing the milk, buttermilk, or other liquids in which the liquid is placed under high pressure and sprayed through a heated member.

It is a further object of the invention to provide apparatus for evaporating and deodorizing milk, buttermilk, or other liquids in which the liquid is placed under high pressure and then delivered through a nozzle in a fine jet into the interior of a heated tube, the milk thus being delivered into a container with which the tube communicates, a partial vacuum preferably being maintained in said container and tube.

It is more specifically an object of the invention to provide an apparatus for evaporating and deodorizing milk, buttermilk, or similar liquids, comprising a drum through which extend a plurality of tubes, means being provided to circulate a heating medium within said drum about said tubes, said drum having a chamber at one end for receiving the liquid under high pressure and from which a spraying nozzle extends into each of said tubes and is directed longitudinally of said tube, said drum communicating at its lower end with a container adapted to receive the liquid from said tubes and in which a partial vacuum is preferably maintained.

These and other objects and advantages of the invention will be fully set forth in the following description made in connection with the accompanying drawings, in which like reference characters refer to similar parts throughout the several views and in which:—

Fig. 1 is a view in side elevation of the apparatus;

Fig. 2 is a view in vertical section through the evaporating portion of the apparatus;

Fig. 3 is a section taken on line 3—3 of Fig. 2, as indicated by the arrows;

Fig. 4 is a central section through a spraying nozzle used; and

Fig. 5 is a view in side elevation of a portion of said nozzle.

Referring to the drawing, in Fig. 1 a tank or container 5 is shown, in which the liquid to be evaporated, such as the milk or buttermilk, is contained. A conduit 6 leads from the tank 5 to the inlet side of a high pressure pump 7. While various types of high pressure pumps may be used, in the embodiment of the invention illustrated a pump is shown comprising a frame 8 having bearings at its upper end in which are journaled the shaft 9 having the driving pulley 10 at one end thereof. Eccentrics 11 are disposed on the shaft 9 and connected by plungers 12, the pistons reciprocating in the cylinders 13. The cylinder 13 communicates with the outlet pipe 14 through which the milk is forced under high pressure. The outlet pipe 14 extends to and communicates with a chamber 15. The chamber 15 is formed at one end of the drum 16, secured at its lower end to and extending upwardly from, a container 17. The drum 16 is illustrated as cylindrical in shape and has heads 18 and 19 at its lower and upper ends respectively, which heads are formed by circular plates having flanges at their outer sides extending substantially at right angles to the planes of said plates. The flanges of the plates 18 and 19 are riveted to the sides of the drum 16 as clearly shown in Fig. 2. The drum 16 at its upper end above the head 19 has the angular flanges 20 extending thereabout and welded or riveted thereto. A head member 21 of semi-spherical or dome-like shape is provided having a flange at its outer edge secured by the circumferentially spaced headed and nutted bolts 22 to the outwardly extending flange of member 20, a gasket preferably being disposed between members 21 and 20. The nuts on bolts 22 may be left somewhat loose so that the cover is not absolutely tight under certain conditions. The head 21 also has a flange 21ᵃ extending within the upper end of the drum 16 which is interiorly threaded to receive a plate 23. A plurality of tubes 24 are provided which extend longitudinally through the drum 16 with their axes parallel to the axis of said drum, which tubes are secured at their lower and upper ends respectively in the heads or plate 18 and 19 as by having their ends flanged at the outer side of said plates. While various types of tubes might be used, in practice the tubes 24 have been made of copper and have been approximately two inches in diameter. A spray nozzle 25 is removably secured in the plate 23 as by being threaded therein in central alinement with each tube 24. The upper ends of the nozzles 25 communicate with the chamber 15. While various kinds of nozzles might be used, one form which has been found to be quite efficient is that shown in Figs. 4 and 5. This nozzle is shown as comprising a cup shaped sleeve 26 interiorly threaded at its open end to receive a short nipple 27. A plug or block 28 cylindrical in form is disposed at the closed end of the sleeve and has its lower end recessed to be semi-spherically concave. The plug 28 also has a plurality of small helical grooves 28ᵃ extending about its exterior from top to bottom. The cup 26 has a conical depression at its lower end from the apex of which a small aperture 26ᵃ extends through the end of said sleeve. The drum 16 has flanged couplings 29 secured thereto into which are threaded the pipes 30 and 31 respectively, by means of which a heating medium can be circulated in the drum 16 about the tubes 24. A drain pipe 32 is also secured in a similar coupling 33 at the lower corner of the drum 16, said pipe 32 having a controlling valve 34 therein.

The drum 16 has an out-turned flange 16ᵃ at its lower end which is secured by circumferentially spaced headed and nutted bolts to a flange 35ᵃ on the upper end of the member 35 comprising a projection from the container 17 and secured thereto by having an out-turned flange 35ᵇ riveted to the side of the container 17. The container 17 as shown is cylindrical in shape with its axis vertical, and has a conical lower end from which leads the discharge pipe 36. The discharge pipe 36 has a T member 42 secured thereto having its lower end plugged and from a side of which extends a pipe 43 having a suitable valve 44 therein. Said container has a flat dome-like top from which leads a conduit 37. A manhole cover 38 is disposed in one side of the container 17 and bolted by spaced headed and nutted bolts to the frame 39 surrounding the manhole in the side of the container 17 and riveted to said container. The container also preferably has a flanged member 40 secured at one side thereof carrying a glass plate 41 through which the interior of the the container may be observed. The container is supported in any suitable manner as by a plurality of legs 45 illustrated as formed of pipes secured at their upper ends in the flanged coupling members 46 secured to the bottom of the container and at their lower ends in the members 47 having flanges resting upon the floor or other supporting surface.

The conduit 39 at the top of the container is shown as being connected to the inlet side of a rotary air pump, blower, or vacuum pump and condenser 48. The member 48 will be supported upon a convenient bracket or shelf.

In operation the milk in the tank 5 will be led through conduit 6 to the inlet side of the high pressure pump 7. While various pressures may be used, in practice a pressure of from 500 to 2300 pounds per square inch is placed on the milk by the pump 7. The milk is delivered at this pressure into the chamber 15 in the head 21 and passes at this pressure into the nozzles 26. The milk is given a rotating movement by the plug 28 and is sprayed outwardly through the aperture 26ᵃ in an expanding jet. The milk is thus directed with great force longitudinally of the tubes 24 and against the interior thereof. A heating medium such as hot water or steam will be circulated through the drum 16 through the inlet pipe 31 and the outlet pipe 30 and this medium will heat the tubes 24. If steam is used, the condensation therefrom can be drained off when desired through the pipe 32 by manipulation of the valve 34. The milk is sprayed on said heated tubes forming a film thereon and a film evaporation is thus obtained. The milk or other liquid passes longitudinally through the tubes 24 and out at the bottoms thereof. The liquid has a tendency to expand after being released from the high pressure. The pump or blower 48 will be operated from a suitable source of power and a current of air will be drawn continuously out from the top of the container 17. This air will be drawn partly from the milk and some air will be drawn under the cover 21, nuts 22 being left somewhat loose when the device is not operated under vacuum. This will tend to draw the milk or other liquid longitudinally of the tubes 24 and the moisture which is evaporated from the milk when the same is forcibly sprayed against the interior of the hot tubes will be carried off through the outlet 37. The expansion and evaporation of the milk in the tubes 27 and the carrying off of the resulting vapor acts to deodorize the milk and the same passes to the bottom of the container 17 in a very sweet and fresh and much improved condition. If desired, the pump blower 48 can be operated to maintain a vacuum or partial vacuum in the container 17 and drum. When such a vacuum is maintained, it emphasizes the expansion of the milk when sprayed into the tubes and hastens the evaporation of the moisture therefrom. When the vacuum is to be maintained, the vacuum pump above mentioned is used. When the apparatus is used without vacuum an ordinary rotary blower is used as the member 48. The milk, buttermilk and other liquid is thus in somewhat thicker condition at the bottom of the container 17, especially when the device is being operated under vacuum.

From the above description it is seen that applicant has provided a highly efficient apparatus for evaporating and deodorizing liquids such as milk, or buttermilk. The apparatus used is quite simple and the operation of the device is carried on with comparatively little trouble or attention. The apparatus has been used in connection with the method and apparatus of drying buttermilk disclosed in U. S. Patent 1,501,182 granted to me July 15, 1924, and has greatly increased the capacity of the machine of said apparatus and method.

It will, of course, be understood that various changes may be made in the form, details, arrangement and proportions of the apparatus without departing from the scope of applicant's invention, which, generally stated, consists in the apparatus disclosed and defined in the appended claim.

What is claimed is:—

An apparatus for condensing and deodorizing milk, cream or similar liquids having in combination, a vertically disposed vessel having an upwardly inclined extension projecting from its side at some distance from the bottom thereof, a drum co-axially aligned with said extension and extending upwardly therefrom having spaced heads, a plurality of tubes having their ends respectively fixed in said heads, a plate overlying the head at the upper end of said drum having a plurality of nozzles fixed therein centrally aligned respectively with each of said tubes, said plate forming the bottom of a chamber above said drum, means for supplying milk to said chamber at high pressure, means for circulating a heating medium in said drum about said tubes and means for drawing off air and vapor from the top of said vessel.

In testimony whereof I affix my signature.

CHRIS M. PETERSON.